United States Patent [19]
Maurer et al.

[11] 3,976,156
[45] Aug. 24, 1976

[54] SHOCK ABSORBER ARRANGEMENT FOR MATERIAL HANDLING VEHICLE

[75] Inventors: Herman J. Maurer, Terre Haute; Donald C. Baker, Rosedale, both of Ind.

[73] Assignee: J. I. Case Company, Racine, Wis.

[22] Filed: May 15, 1974

[21] Appl. No.: 470,070

[52] U.S. Cl. .................................. 180/41; 280/112 R
[51] Int. Cl.² ........................................ B60G 13/00
[58] Field of Search ............. 180/41; 280/111, 112, 280/112 A, 104.5 R, 104.5 A; 188/315

[56] References Cited
UNITED STATES PATENTS

| | | | |
|---|---|---|---|
| 2,754,131 | 7/1956 | Tulin | 280/104.5 A |
| 3,039,760 | 6/1962 | Jackson | 188/315 |
| 3,077,952 | 2/1963 | Neises | 280/6 H X |
| 3,554,576 | 1/1971 | Parker | 280/112 R |
| 3,567,243 | 3/1971 | Ruhlin | 280/112 R |
| 3,625,531 | 12/1971 | Ranzenhofer | 280/112 R |
| 3,759,541 | 9/1973 | Peterson | 280/112 R |
| 3,765,553 | 10/1973 | Schaeff | 280/111 |

*Primary Examiner*—Kenneth H. Betts
*Attorney, Agent, or Firm*—Dressler, Goldsmith, Clement, Gordon & Shore, Ltd.

[57] ABSTRACT

A vehicle having a material handling unit suspended on the rear end thereof is disclosed herein. The vehicle has a pair of drive wheels adjacent the rear end and a pair of steering wheels supported on an axle that extends transversely of the body at the forward end and is pivotally connected to the body for pivotal movement about a vertical plane. A single shock absorber is interposed between the axle and the body to maintain one steering wheel in ground engaging contact during oscillatory movement of the body about the axis for the drive wheels.

4 Claims, 4 Drawing Figures

SHOCK ABSORBER ARRANGEMENT FOR MATERIAL HANDLING VEHICLE

BACKGROUND OF THE INVENTION

The present invention relates to a material handling vehicle of the type wherein the body of the vehicle is driven by a pair of drive wheels located adjacent the rear end thereof and a pair of steering wheels located adjacent the front end. The vehicle has a material handling unit suspended from the rear end of the body.

In vehicles of this type, the center of gravity of the material handling unit is located a substantial distance rearwardly of the transverse axis for the rear drive wheels. Since the weight of the material handling unit closely approximates the weight of the body of the vehicle, which is located forwardly of the rear drive wheels, it has been customary to provide outriggers that extend from the body or the material handling unit at a point rearwardly of the rear drive wheels for the vehicle. These outriggers are utilized to stablize the vehicle during the use of the material handling unit at a construction site. When the outriggers are in their extended positions, the vehicle is essentially supported on the two outriggers adjacent the rear end of the body and the steering wheels adjacent the front end.

In a vehicle of this type, difficulties have been encountered in transporting the vehicle from one construction site to another. It has been found that when the vehicle is being driven at roadway speeds over rough terrain, an oscillating motion of the vehicle about the axle supporting the rear wheels will be developed. It necessarily results from the fact that the weights on opposite sides of the rear axle or axis are substantially equal. This oscillating motion becomes even more severe even over a fairly smooth road when the oscillatory motion hits some harmonic or resonant frequency. When this situation occurs, it many times results in having the front wheels off the ground for a substantial period of time. To dampen this oscillation, it becomes necessary for the operator to slow the machine to a point were the oscillation is stopped. This of course is highly undesirable since it substantially increases the time required for transporting one vehicle from one construction site to another.

SUMMARY OF THE INVENTION

According to the present invention, one of the front wheels supported on a transverse axle that is pivoted about the longitudinal center of the body is at all times biased towards the ground engaging position to insure that there is control of the vehicle at all times.

More specifically, a single shock absorbing mechanism is interposed between the front axle of a vehicle that has a longitudinal body with the axle pivoted about a horizontal pivot axis generally aligned with the longitudinal axis for the vehicle. The shock absorber is positioned so that one of the front steering wheels is at all times biased towards the ground to insure control of the vehicle even though oscillatory motions are created about an axis extending through the center of the rear driving wheels for the vehicle, which has a material handling unit supported rearwardly of the rear wheels.

The shock absorbing mechanism is designed to be capable of varying the shock absorbing characteristics thereof at the will of the operator.

More specifically, the vehicle to which this invention is directed includes a body that has a forward end and a rear end with a pair of driving wheels supported for rotation about an axis that extends transversely of the longitudinal center of the body adjacent the rear end thereof. The vehicle also includes a material handling unit that is suspended beyond the rear end of the vehicle to produce an overhanging weight while the vehicle includes an axle extending transversely of the body adjacent the forward end and is pivotally connected to the body by a pivotal connection that has its axis longitudinally aligned with the longitudinal center of the body. The front steering wheels are supported on the respective ends of the transverse front axle and the axle is pivoted along a vertical plane that extends transversely of the longitudinal center. The shock absorbing mechanism includes a single shock absorber that has one end connected to the body and an opposite end connected to the axle at a point between the pivotal connection and the adjacent wheel so that the shock absorber will maintain the adjacent wheel in ground engaging contact during pivotal movement of the axle, which is caused by oscillation of the body about a transverse axis through the centers of the driving wheels. The shock absorbing mechanism or unit is specifically located in the vertical plane of movement for the front axle and is pneumatically controlled with the control incorporating means for varying the shock absorbing characteristics of the unit.

DETAILED DESCRIPTION

Figure 1:
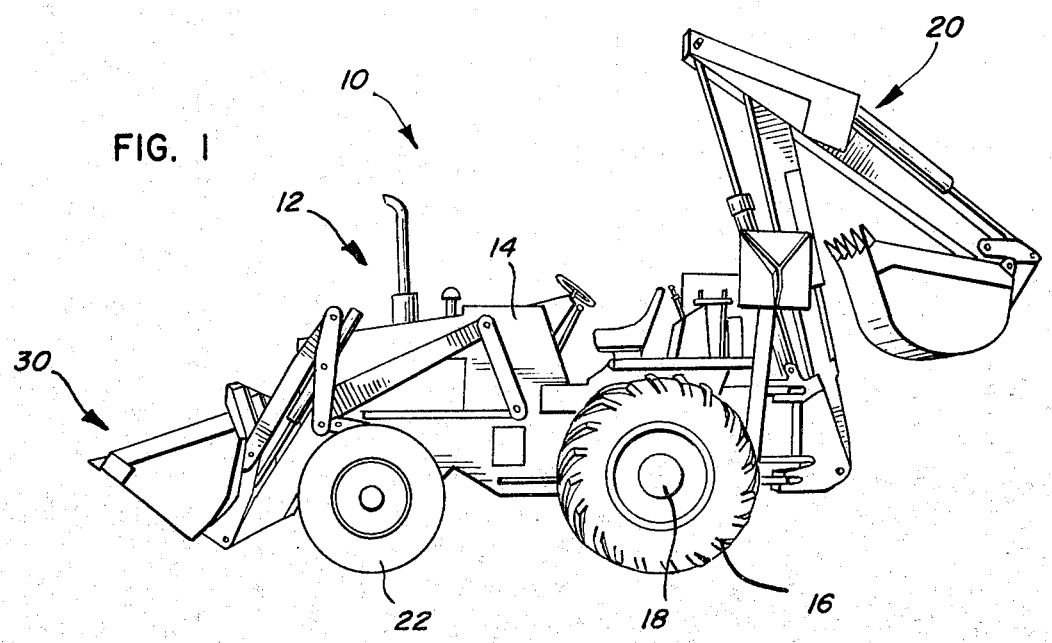
FIG. 1 is a side elevation view of a vehicle having the present invention incorporated therein.
Figure 2:
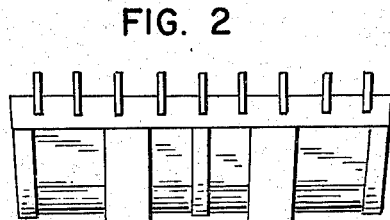
FIG. 2 is a front end view of the vehicle shown in FIG. 1 in a static condition.
Figure 3:
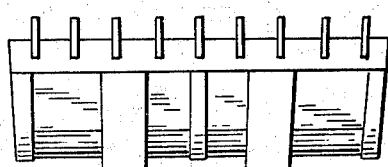
FIG. 3 is a view similar to FIG. 2 showing the unit in a mobile condition.
Figure 4:
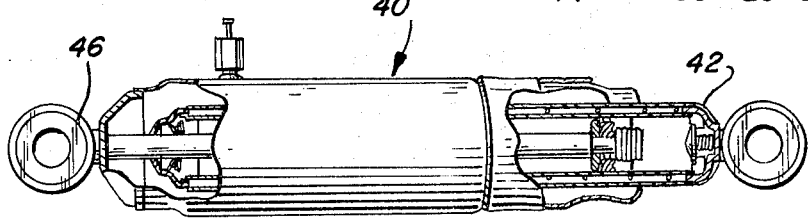
FIG. 4 is an enlarged view as viewed along line 4—4 of FIG. 3, with parts thereof being broken away for clarity.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a material handling implement, generally designated by the reference numeral 10. Material handling implement 10 consists of a vehicle 12 that has a body 14 supported on a pair of rear driving wheels 16 that are respectively rotatably supported on a rear axle 18 that defines the centers for the wheels. Body 14 of material handling implement 10 has a material handling unit 20, such as a backhoe, suspended on therear end thereof and positioned so that the center of gravity of the mass defining material handling unit 20 is located a substantial distance rearwardly of axle 18.

Vehicle 12 also includes a pair of steering wheels 22 respectively rotatably supported on opposite ends of a front axle 24 that extends transversely of the longitudinal center of body 14 adjacent the forward end thereof. Front axle 24 is pivotally supported by a pivotal connection, such as a pin 26 that is centrally aligned with the longitudinal center for body 14 and defines a pivotal connection between the body and front axle 24. Pivotal connection 26 and front axle 24 are positioned so that the front axle is pivoted along a vertical plane that extends generally transversely of the longitudinal center of body 14 at the forward end thereof.

Material handling implement 10 may also have a material handling unit 30 suspended on the front end thereof. In the illustrated embodiment, material handling unit 30 consists of a front end loader which is pivotally supported adjacent the forward end of body 14 in the usual and well known fashion.

As was indicated above, one of the problems encountered with units of this type is that the large mass of material handling unit 20 and its location with respect to rear axle 18 produces an almost equal balancing downward gravitational force rearwardly of axle 18 which is substantially equal to the downward force produced by body 14 and material handling unit 30 located forwardly of rear axle 18. Stated another way, the overhanging weight resulting from material handling unit 20 located rearwardly of rear axle 18 results in an oscillatory action about rear axle 18 when the vehicle is being transported at high speeds over anything but completely smooth terrain. This condition becomes even more severe when the front wheels of the vehicle start to hit waves or bumps at certain times which may result in a harmonic or resonant frequency with respect to the oscillation which further aggravates the oscillatory problem discussed above.

When such oscillatory motion is created in the material handling implement 10 about rear axle 18, the result is that the front wheels 22 tend to move upwardly a sufficient distance to be spaced from the ground which results in losing control of the vehicle. This problem is further aggravated by the resulting harmonic or resonant frequencies which may result in having the vehicle traveling at a substantial speed with only the rear wheels supported on the ground. To overcome this problem, it is necessary for the operator to substantially reduce the speed of the vehicle to interrupt the oscillatory motion.

According to the present invention, the above mentioned problems are overcome by a simple dampening mechanism that is interposed at a specific location with respect to the front axle and the body so as to constantly and continually bias one of the front wheels towards the ground, without regard to any position of the other front wheel with respect to the ground. This insures that the operator will at all times have control of the steering action of the vehicle with at least one of the front wheels.

The shock absorbing mechanism or shock absorber 40 may be of the conventional commercially available type sold by Montgomery Ward and Co., Inc. as an air adjustable shock absorber or of the type shown in U.S. Pat. No. 3,039,760.

Shock absorber 40 consists of a first element 42 connected to front axle 24 at a point spaced from pivot pin 26 by a pin or bolt 44. A second element 46 of shock absorber 40 is connected to body 14 through a lug 48 extending from one side of body 14 with a pin 50 defining the connection between lug 48 and element 46.

With the arrangement so far described, during normal operation of material handling implement 10, shock absorber elements 42 and 46, defining biased-apart elements will remain in a substantially static condition.

However, when material handling implement 10 is being transported form one site to another at a substantial rate of speed, any bumps or uneven terrain that are encountered will tend to produce an oscillatory motion of body 14 and material handling unit 20 about rear axle 18. This, as explained above, will cause wheels 22 to be raised above ground level G. When such a situation occurs, shock absorber mechanism 40 will become operational and so that biased-apart elements 42, 46 will automatically and continuously bias right front steering wheel 22 towards a ground engaging position so that the operator has steering control of the vehicle regardless of the degree of oscillation that is developed with respect to rear axle 18.

As can be seen from the above description, the present invention provides a unique arrangement wherein a simple and inexpensive commercially available shock absorbing unit can be utilized to overcome and dampen any oscillation which may result from transporting the material handling implement 10 along roadways at high rates of speed.

What is claimed is:

1. A vehicle including a body having a forward end and a rear end; a pair of driving wheels on opposite sides of a longitudinal center of said body adjacent said rear end; a material handling unit suspended on said rear end; a front axle extending transversely of said body adjacent said forward end; a pivotal connection between said body and said axle, said pivotal connection having its axis aligned with said longitudinal center so that said axle is pivoted along a vertical plane extending transversely of said longitudinal center; a pair of steering wheels respectively supported on opposite ends of said axle; and a single shock absorber of the type having biased-apart elements having one end connected to said body and an opposite end connected to said axle at a point between said pivotal connection and the adjacent wheel, said single shock absorber defining the only additional interconnection between said axle and said body so that said shock absorber will maintain said adjacent wheel in ground engaging contact during pivotal movement of said axle caused by oscillation of said body about a transverse axis through the centers of said driving wheels.

2. A vehicle as defined in claim 1, in which said shock absorber is located in said vertical plane.

3. A vehicle as defined in claim 1, in which said shock absorber is pneumatic.

4. A vehicle as defined in claim 3, in which said shock absorber incorporates means for varying the shock absorbing characteristics thereof.

* * * * *